(12) United States Patent
Ishihara

(10) Patent No.: US 6,694,238 B2
(45) Date of Patent: Feb. 17, 2004

(54) ELECTRIC POWER STEERING APPARATUS

(75) Inventor: Atsushi Ishihara, Gifu (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/287,769

(22) Filed: Nov. 5, 2002

(65) Prior Publication Data

US 2003/0109974 A1 Jun. 12, 2003

(30) Foreign Application Priority Data

Nov. 5, 2001  (JP) ........................................ 2001-339896

(51) Int. Cl.$^7$ .............................................. G06F 17/00
(52) U.S. Cl. ...................... 701/41; 180/6.2; 180/6.24; 318/689; 318/114; 318/432
(58) Field of Search ............... 701/41, 42, 43; 180/6.2, 6.24; 318/689, 34, 35, 114, 115, 432

(56) References Cited

U.S. PATENT DOCUMENTS

| 5,475,289 A | * 12/1995 | McLaughlin et al. ........ 318/432 |
| 5,743,351 A | * 4/1998 | McLaughlin ................ 180/446 |
| 6,122,579 A | * 9/2000 | Collier-Hallman et al. ... 701/41 |
| 6,498,451 B1 | * 12/2002 | Boules et al. ................ 318/661 |

FOREIGN PATENT DOCUMENTS

| EP | 1308368 A2 | * 5/2003 | ............ B62D/6/00 |
| JP | 2000-287481 | 10/2000 | |

* cited by examiner

Primary Examiner—William A. Cuchlinski, Jr.
Assistant Examiner—Olga Hernandez
(74) Attorney, Agent, or Firm—Rabin & Berdo, P.C.

(57) ABSTRACT

An electric power steering apparatus for assisting steering by conferring torque generated by an electric motor to a steering mechanism. The apparatus includes: a correction table created based on a result of actual measurement of torque ripple occurring when a predetermined reference current is supplied to the electric motor; a basic command value setting portion for setting a basic command value according to a steering manipulation of a driver; a current command value setting portion for setting a current command value by correcting the basic command value set by the basic command value setting portion with reference to the correction table; and a motor current control portion for controlling a current to be supplied to the electric motor based on the current command value set by the current command value setting portion.

4 Claims, 3 Drawing Sheets

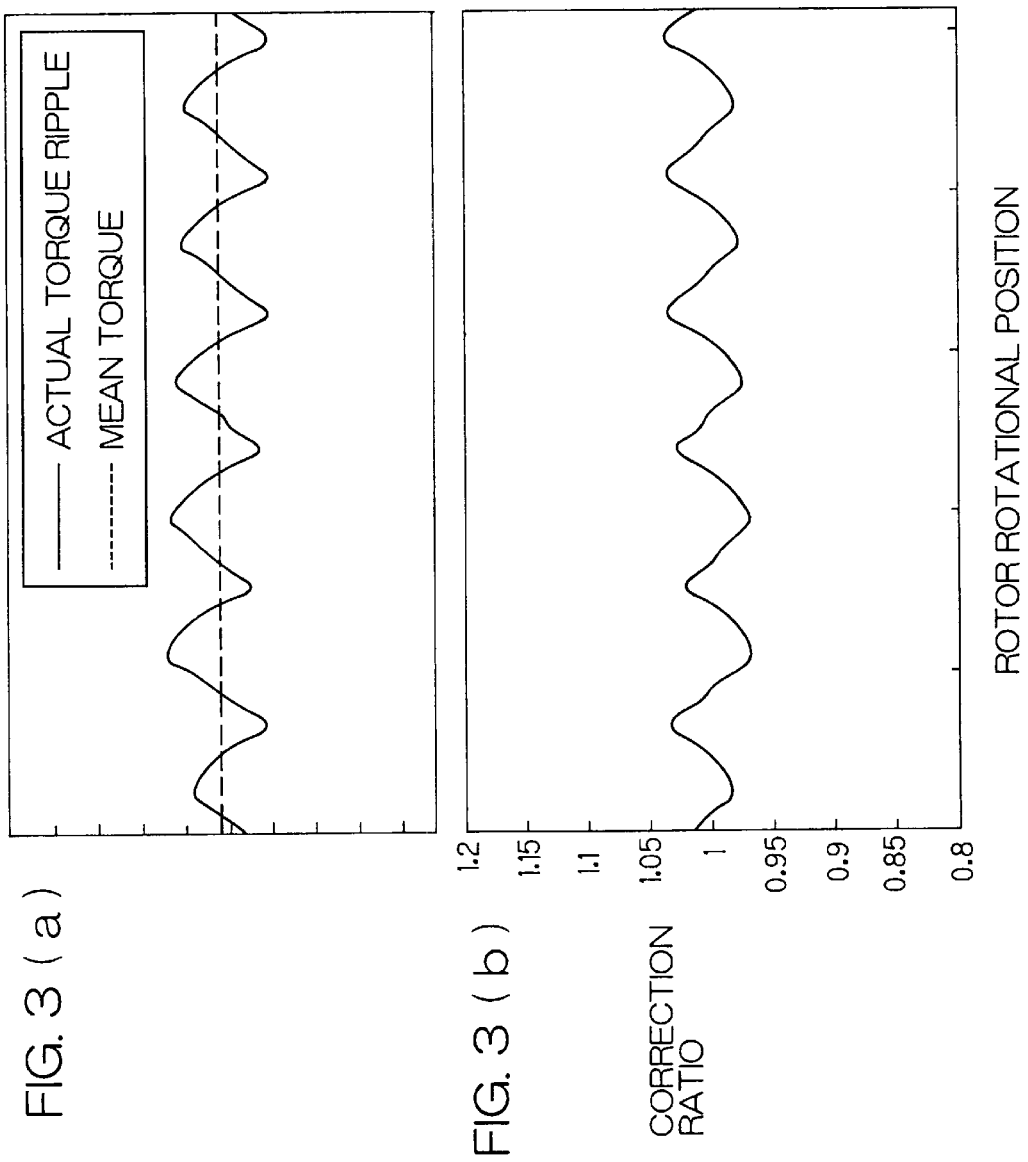

ELECTRIC POWER STEERING APPARATUS

BACKGROUND OF THE INVENTION

1. Field of the Invention

The invention relates to an electric power steering apparatus for assisting steering by conferring torque generated by an electric motor to a steering mechanism.

2. Description of Related Art

Conventionally, an electric power steering apparatus that confers torque generated by an electric motor to a steering mechanism has been employed to assist steering. Such a power steering apparatus uses a three-phase brushless motor as the electric motor and a sine-wave driving method for supplying sine-wave currents of each phase to the electric motor is often adopted as a driving method for the three-phase brushless motor.

According to the sine-wave driving method, torque ripple of the electric motor hardly occurs when the waveform of an induced voltage shapes a sine wave.

However, irregularities in arrangement among circuits for supplying currents of each phase to the electric motor cause the waveform of the induced voltage to be deformed as a higher harmonic wave superimposes the sine wave. In particular, in a case where the electric motor is of a type that a permanent magnet is embedded in a rotor (so-called IPM motor), a distribution of magnetic flux density forms a trapezoidal shape, and the waveform of the induced voltage is thereby deformed significantly. The deformation of the waveform of the induced voltage gives rise to torque ripple of the electric motor, and the torque ripple of the electric motor causes oscillation of the steering wheel, which impairs the steering feeling.

SUMMARY OF THE INVENTION

An object of the invention is to provide an electric power steering apparatus capable of suppressing the occurrence of torque ripple of the electric motor and thereby improving the steering feeling.

An electric power steering apparatus of the invention is an electric power steering apparatus for assisting steering by conferring torque generated by an electric motor to a steering mechanism. The apparatus includes: a correction table created based on a result of actual measurement of torque ripple occurring when a predetermined reference current is supplied to the electric motor; a basic command value setting portion for setting a basic command value according to a steering manipulation of a driver; a current command value setting portion for setting a current command value by correcting the basic command value set by the basic command value setting portion with reference to the correction table; and a motor current control portion for controlling a current to be supplied to the electric motor based on the current command value set by the current command value setting portion.

According to the invention, the basic command value set according to a steering manipulation of a driver is corrected with reference to the correction table created based on the result of actual measurement of torque ripple (in such a manner so as to suppress the occurrence of torque ripple). The current command value is updated to the corrected value, according to which a value of a current to be supplied to the electric motor is controlled. Consequently, it is possible to suppress the occurrence of torque ripple of the electric motor, and the satisfactory steering feeling can be thus achieved.

The correction table may be a table that defines a correction ratio of the current command value with respect to a given rotational position of a rotor of the electric motor.

In this case, the current command value setting portion may set, for example, a product of the basic command value set by the basic command value setting portion and the correction ratio read out from the correction table to the current command value. Also, the current command value setting portion may include a correction value setting portion for setting a ripple correction value by multiplying the basic command value set by the basic command value setting portion and a value of the correction ratio read out from the correction table in correspondence with the given rotational position of the rotor of the electric motor minus 1, and an addition portion for adding the ripple correction value set by the correction value setting portion to the basic command value set by the basic command value setting portion and outputting the sum as the current command value.

The above and other objects, features, and advantages of the invention will become more apparent from the following description of embodiments with reference to the accompanying drawings.

BRIEF DESCRIPTION OF THE DRAWINGS

FIGS. 3(a) and 3(b) are diagrams for explaining a method of creating a correction table.

DESCRIPTION OF THE PREFERRED EMBODIMENTS

Figure 1:
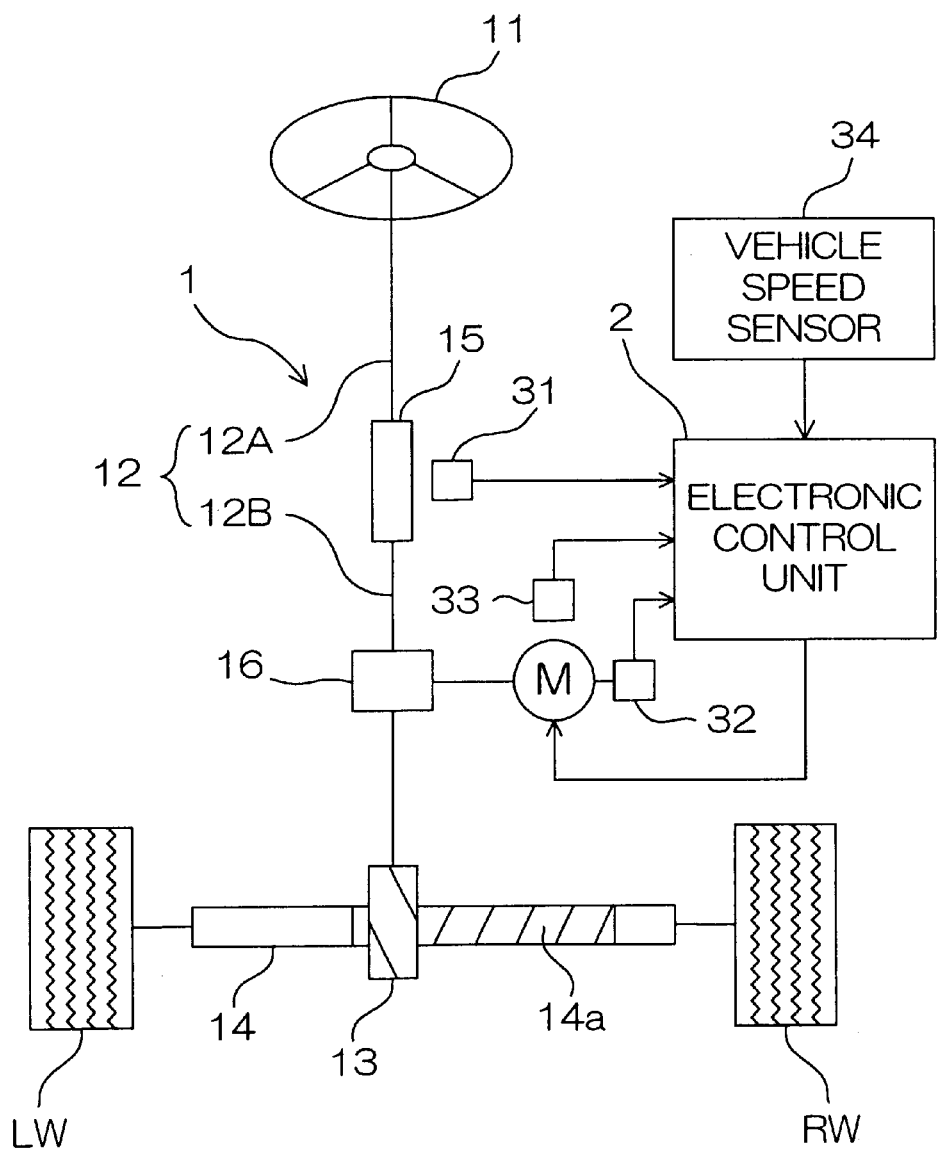
FIG. 1 is a conceptual illustration showing a basic arrangement of an electric power steering apparatus according to one embodiment of the invention.

FIG. 1 is a conceptual illustration showing a basic arrangement of an electric power steering apparatus according to one embodiment of the invention. The electric power steering apparatus is provided in association with a steering mechanism 1 of a vehicle, and is used to confer a steering assisting force to the steering mechanism 1.

The steering mechanism 1 includes a steering wheel 11 manipulated by a driver, a steering shaft 12 linked to the steering wheel 11, a pinion gear 13 provided at the front end of the steering shaft 12, and a rack bar 14 extending in the width direction of the vehicle. The rack bar 14 is provided with a rack gear portion 14a, which is meshed with the pinion gear 13. Also, wheels LW and RW used for steering are coupled respectively to the both ends of the rack bar 14 through tie rods and knuckle arms or the like (not shown), and a linear motion of the rack bar 14 in the width direction of the vehicle is converted to a rotary steering force of the wheels LW and RW by the tie rods and the knuckle arms or the like.

According to this arrangement, rotations of the steering shaft 12 are converted to a linear motion of the rack bar 14 first by the pinion gear 13 and the rack gear portion 14a, then converted to a rotary steering force depending on a direction of the linear motion, and transmitted to the wheels LW and RW.

The steering shaft 12 is divided into an input shaft 12A coupled to the steering wheel 11 and an output shaft 12B coupled to the rack bar 14. The input shaft 12A and the output shaft 12B are linked to each other through a torsion bar 15 on which torsion is caused from relative rotations of these two shafts. The output shaft 12B is provided with a reduction mechanism 16 interposed somewhere about the midpoint, and a rotational force of an electric motor M is thereby inputted into the output shaft 12B as a steering assisting force through the reduction mechanism 16.

The electric motor M is composed of a three-phase brushless motor, and sine-wave currents having predetermined phases relative to each other from an electronic control unit 2 are supplied thereto. Connected to the electronic control unit 2 are: a torque sensor 31 for detecting a direction and magnitude of torsion caused on the torsion bar 15 as steering torque; a rotor rotational position sensor 32 for detecting a rotational position of a rotor (rotor rotational position) of the electric motor M; a motor current sensor 33 for detecting a current (motor current) flowing through the electric motor M; and a vehicle speed sensor 34 for detecting a running speed (vehicle speed) of the vehicle on which the electric power steering apparatus is mounted. The electronic control unit 2 sets a current command value based on the detection results from the torque sensor 31, the rotor rotational position sensor 32, and the vehicle speed sensor 34, and effects feedback control on sine-wave currents of each phase flowing through the electric motor M based on the current command value thus set and a value of the motor current detected by the motor current sensor 33.

Figure 2:
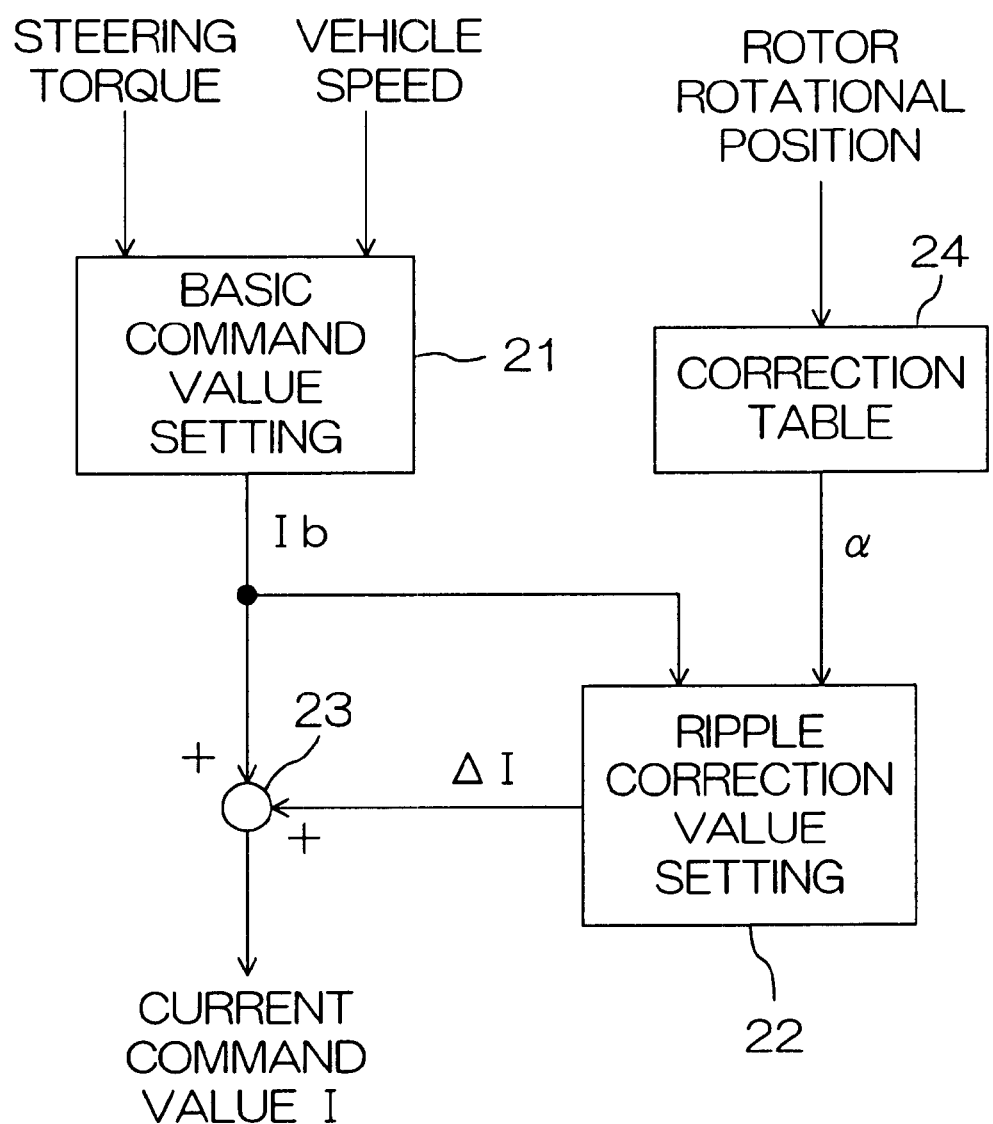
FIG. 2 is a block diagram for explaining the settings of a current command value.

FIG. 2 is a block diagram for explaining the settings of the current command value by the electronic control unit 2. The electronic control unit 2 includes a microcomputer, and a current command value I depending on the value of a current to be supplied to the electric motor M is set by running a program on the microcomputer.

To be more specific, the electronic control unit 2 practically includes a basic command value setting portion 21 for setting a basic command value Ib depending on the steering torque detected by the torque sensor 31 and a vehicle speed detected by the vehicle speed sensor 34, a ripple correction value setting portion 22 for setting a ripple correction value ΔI used to reduce torque ripple of the electric motor M, and an addition portion 23 for adding the basic command value Ib set by the basic command value setting portion 21 and the ripple correction value ΔI set by the ripple correction value setting portion 22 and outputting the sum as the current command value I.

The basic command value setting portion 21 designates a minute range including zero as a dead zone, for example, and for the steering torque outside of the dead zone, it sets a larger value to the basic command value Ib as the steering torque becomes larger. Also, it sets a larger value to the basic command value Ib as the vehicle speed becomes lower. The value of the wave height of the sine-wave current flowing through the electric motor M thus becomes larger as the steering torque detected by the torque sensor 31 becomes larger or the vehicle speed detected by the vehicle speed sensor 34 becomes lower, which allows the electric motor M to produce a large steering assisting force.

The ripple correction value setting portion 22 is arranged to receive an output value from a correction table 24. The correction table 24 defines a correction ratio α of the current command value with respect to a given rotor rotational position, and is created based on the result of actual measurement of torque ripple occurring when predetermined reference currents of each phase are supplied to the electric motor M. In other words, in order to create the correction table 24, a waveform of torque ripple in one cycle of electrical angle (one rotation of the rotor) is measured actually, and a mean value of torque ripple is obtained from this actually measured waveform of torque ripple. Further, a ratio α (=mean value of torque ripple/value of torque ripple) of the mean value of torque ripple to a value of torque ripple at each rotor rotational position is calculated, and each calculated ratio α is stored into a memory in a one-to-one correspondence with the rotor rotational position. The correction table 24 is thus created. For example, when the obtained result of actual measurement is the waveform of torque ripple as shown in FIG. 3(a), then a rotor rotational position versus correction ratio characteristic as shown in FIG. 3(b) is obtained. The correction table 24 is a table created by storing such a characteristic into a memory in a form of a table.

The rotor rotational position sensor 32 detects a rotor rotational position at the same timing as the detection timing of the torque sensor 31 and the vehicle speed sensor 34. A correction ratio α corresponding to the detected rotor rotational position is read out from the correction table 24 and inputted into the ripple correction value setting portion 22. Then, the ripple correction value setting portion 22 calculates a ripple correction value ΔI based on the input correction ratio α and the basic command value Ib set by the basic command value setting portion 21. In other words, the ripple correction value setting portion 22 calculates the ripple correction value ΔI according to Equation (1) as follows:

$$\Delta I = (Ib/Ib\text{max}) \times (\alpha - 1) \times Ib\text{max} \qquad (1)$$
$$= Ib(\alpha - 1)$$

where Ibmax is the maximum value of the basic command value Ib.

The basic command value Ib and the ripple correction value ΔI set in this manner are added in the addition portion 23, and the current command value I=Ib+ΔI is thus set.

Because the ripple correction value ΔI is expressed by Equation (1) described above, the current command value I is expressed as:

$$I = Ib + Ib \times (\alpha - 1) = Ib \times \alpha$$

In other words, the product of the basic command value Ib set by the basic command value setting portion 21 and the correction ratio α read out from the correction table 24 is set to the current command value I. The correction ratio α takes a smaller value as the value of torque ripple becomes larger, or takes a larger value as the value of torque ripple becomes smaller. Hence, the current command value I set by multiplying the basic command value Ib and the correction ratio α is set to a smaller value at a rotor rotational position where torque ripple takes a larger value, and to a larger value at a rotor rotational position where torque ripple takes a smaller value. Consequently, by controlling a driving current of the electric motor M based on the current command value I, it is possible to suppress the occurrence of torque ripple of the electric motor M, and the satisfactory steering feeling can be thus achieved.

The above description has described one embodiment of the invention. It should be appreciated, however, that the invention can be implemented in any other embodiment. For example, in the embodiment described above, the current command value I is set by adding the basic command value Ib set by the basic command value setting portion 21 and the ripple correction value ΔI set by the ripple correction value setting portion 22. However, a multiplication portion may be provided instead of the ripple correction value setting portion 22 and the addition portion 23, so that the current command value I is set by multiplying the basic command value Ib set by the basic command value setting portion 21 and the correction ratio α read out from the correction table 24 in the multiplication portion.

Also, in the embodiment described above, the correction table 24 is a table created by calculating the ratio α of the mean value of torque ripple to the value of torque ripple at each rotor rotational position, and by storing each calculated ratio α into the memory in a one-to-one correspondence with the rotor rotational position. However, it may be a table created by calculating the product of multiplying a value of the correction ratio α of the current command value with respect to each rotor rotational position minus 1 and the maximum value Ibmax of the basic command value Ib, and by storing each product into the memory in a one-to-one correspondence with the rotor rotational position. In short, the correction table 24 may define the relationship of (α−1)× Ibmax with respect to a given rotor rotational position. In this case, the ripple correction value setting portion 22 calculates the ripple correction value ΔI by merely multiplying the value read out from the correction table 24 and the quotient of the basic command value Ib divided by the maximum value Ibmax. The calculation contents in the ripple correction value setting portion 22 can be thus simplified.

The foregoing description has described embodiments of the invention in detail. It should be appreciated, however, that these embodiments represent examples to provide clear understanding of the technical contents of the invention, and the invention is not limited to these examples. The sprit and the scope of the invention, therefore, are limited solely by the scope of the appended claims.

The present application corresponds to Japanese Patent Application No. 2001-339896 filed with the Japan Patent Office on Nov. 5, 2001, the contents of which are hereby incorporated by reference.

What is claimed is:

1. An electric power steering apparatus for assisting steering by conferring torque generated by an electric motor to a steering mechanism, the apparatus comprising:

a correction table created based on a result of actual measurement of torque ripple occurring when a predetermined reference current is supplied to the electric motor;

a basic command value setting portion for setting a basic command value according to a steering manipulation of a driver;

a current command value setting portion for setting a current command value by correcting the basic command value set by the basic command value setting portion with reference to the correction table; and a motor current control portion for controlling a current to be supplied to the electric motor based on the current command value set by the current command value setting portion.

2. The electric power steering apparatus according to claim 1, wherein the correction table defines a correction ratio of the current command value with respect to a given rotational position of a rotor of the electric motor.

3. The electric power steering apparatus according to claim 2, wherein the current command value setting portion sets a product of the basic command value set by the basic command value setting portion and the correction ratio read out from the correction table to the current command value.

4. The electric power steering apparatus according to claim 2, wherein the current command value setting portion includes:

a correction value setting portion for setting a ripple correction value by multiplying the basic command value set by the basic command value setting portion and a value of the correction ratio minus 1, the correction ratio being read out from the correction table in correspondence with the given rotational position of the rotor of the electric motor; and an addition portion for adding the ripple correction value set by the correction value setting portion to the basic command value set by the basic command value setting portion and outputting a sum as the current command value.

* * * * *